United States Patent [19]

Kita

[11] Patent Number: 5,403,792
[45] Date of Patent: Apr. 4, 1995

[54] LOW THERMAL CONDUCTIVITY CERAMIC AND PROCESS FOR PRODUCING THE SAME

[75] Inventor: Hideki Kita, Fujisawa, Japan

[73] Assignee: Isuzu Motors Limited, Tokyo, Japan

[21] Appl. No.: 40,278

[22] Filed: Mar. 30, 1993

[30] Foreign Application Priority Data

Mar. 31, 1992 [JP] Japan .................................. 4-104050

[51] Int. Cl.⁶ .......................................... C04B 35/597
[52] U.S. Cl. ......................................... 501/98; 501/97
[58] Field of Search .................................. 501/98, 97

[56] References Cited

U.S. PATENT DOCUMENTS

| | | | |
|---|---|---|---|
| 4,323,323 | 4/1982 | Lumby et al. | 501/98 |
| 4,506,020 | 3/1985 | Butler et al. | 501/98 |
| 4,711,644 | 12/1987 | Yeckley et al. | 501/98 |
| 5,173,458 | 12/1992 | Nishioka et al. | 511/98 |
| 5,214,009 | 3/1993 | Komatsu et al. | 501/98 |

FOREIGN PATENT DOCUMENTS

| | | |
|---|---|---|
| 0397525 | 11/1990 | European Pat. Off. . |
| 0399750 | 11/1990 | European Pat. Off. . |
| 58-20782 | 2/1983 | Japan . |
| 232971 | 12/1984 | Japan . |
| 260472 | 12/1985 | Japan . |
| 183169 | 8/1986 | Japan . |
| 201663 | 9/1986 | Japan . |
| 113767 | 5/1987 | Japan . |
| 1363630 | 8/1974 | United Kingdom . |

OTHER PUBLICATIONS

Dupree et al, "A High-Resolution NMR Study of the La—Si—Al—O—N System". Jou Am Chem Soc., 111(14), pp. 5125–5132, 1989 no month.
Abstract of JP61201663, Sep. 6, 1986.
Abstract of JP61183169 Aug. 15, 1986.
Abstract of JP810118239 Oct. 1, 1990.
Abstract of JP62113767 May 25, 1987.
*Chemistry of Synthetic High Polymers*, Chemical Abstracts, vol. 110, No. 14, pp. 343–344, Apr. 3, 1989.
Kokmeijer et al, *Microstructure and Mechanical Properties of F Si3Al3O3N5 Ceramics*, Journal of the European Ceramic Society, vol. 8, No. 2, pp. 71–80, 1991 no month.
Mitomo et al, *Thermal Conductivity of a-sialon Ceramics*, Journal of Materials Science Letters, vol. 3 No. 10, pp. 915–916, Oct. 1984.

*Primary Examiner*—Mark L. Bell
*Assistant Examiner*—C. M. Bonner
*Attorney, Agent, or Firm*—Browdy and Neimark

[57] ABSTRACT

The low thermal conductivity ceramic of the present invention comprises a sialon (Si—Al—O—N) and at least one element selected from among La, Dy, Ce, Hf and Zr and has an average grain size of 1.5 μm or less and a thermal conductivity of 0.01 cal/cm·s·°C. or less. It can be produced by raising the temperature of a molding containing a sialon and the above elements in a gas atmosphere having a pressure of 5 arm or more at a high rate to conduct firing. The present invention enables the ceramic structure to be hyperfined and the phonon scattering to be enhanced, so that it is possible to provide a low thermal conductivity ceramic having a high strength and a low thermal conductivity.

3 Claims, 1 Drawing Sheet

LOW THERMAL CONDUCTIVITY CERAMIC AND PROCESS FOR PRODUCING THE SAME

BACKGROUND OF THE INVENTION

1. Field of the Invention

The present invention relates to a low thermal conductivity ceramic mainly composed of a sialon and a process for producing the same.

2. Description of the Prior Art

A conventional process for producing a ceramic, wherein various oxides including $La_2O_3$, $ZrO_2$, $CeO_2$ and $Dy_2O_3$ are added as an assistant, is disclosed in, for example, Japanese Patent Laid-open Nos. 183169/1986, 201663/1986, 113767/1987 and 20782/1983.

Among the above-described laid-open documents, Japanese Patent Laid-Open No. 183169/1986 discloses the use of a sialon. The process for producing a silicon nitride sinter disclosed in this laid-open document comprises adding a sinter aid to a silicon nitride powder and sintering the mixture. The sinter aid comprises a sialon and a rare earth oxide. The weight ratio of sialon to rare earth oxide is limited to 1:1 to 3:1, and the amount of addition of the sialon in terms of inner percentage is limited to 4 to 20% by weight based on the silicon nitride powder. In other words, the laid-open document describes that, in the production of the silicon nitride sinter, a sialon is used as a sinter aid, a dense sinter having a high strength at a high temperature can be produced by sintering under atmospheric pressure without sintering under pressure and sinters or sintered ceramic bodies can be mass produced at a low cost even in the case of articles having a complicated shape and articles having a large size.

The proposals disclosed in the above-described laid-open documents, however, aim principally at enhancing the strength at a high temperature through the crystallization of the grain boundary phase rather than a lowering in the thermal conductivity of the ceramics.

Sialon is a material comprising elements of Si—Al—O—N and which has a relatively low coefficient of thermal expansion, a high corrosion resistance at a high temperature, such as oxidation resistance, and an excellent heat resistance. In order to lower the thermal conductivity of ceramics, it is considered necessary to impart a certain feature to the fine structure of the ceramic per se even when the same oxides as those described above, such as $La_2O_3$ (lanthanum oxide), $ZrO_2$ (zirconium oxide), $CeO_2$ (cerium oxide) and $Dy_2O_3$ (dysprosium oxide), are used as additives.

SUMMARY OF THE INVENTION

An object of the present invention is to solve the above-described problems and to provide a low thermal conductivity ceramic which comprises a sialon Si—Al—O—N in solid solution form as a main component and, added thereto, an oxide of a heavy element, and which ensures a low thermal conductivity while enjoying high denseness i.e. high density, providing an increase in the phonon scattering and introduction of anharmonicity attained by hyperfining the structure through firing under the conditions of a high rate of temperature rise, a low temperature and a gas pressure, and a process for producing the same.

Another object of the present invention is to provide a low thermal conductivity ceramic comprising Si (silicon), Al (aluminum), O (oxygen) and N (nitrogen) and at least one element selected from the group consisting of La (lanthanum), Dy (dysprosium), Ce (cerium), Hf (hafnium) and Zr (zirconium) and having an average grain size of 1.5 $\mu$m or less and a thermal conductivity of 0.01 cal/cm·s·°C. or less.

A further object of the present invention is to provide a process for producing a low thermal conductivity ceramic body which comprises mixing a sialon Si—Al—O—N with an oxide of Al and an oxide of at least one member selected from among La, Dy, Ce, Hf and Zr to prepare a feedstock powder, molding the powder to form a molding and sintering the molding in a gas atmosphere having a pressure of 5 atm or more.

Since the low thermal conductivity sintered ceramic body comprises Si, Al, O and N and at least one element selected from the group consisting of La, Dy, Ce, Hf and Zr and has an average grain size of 1.5 $\mu$m or less and a thermal conductivity of 0.01 cal/cm·s·°C. or less, it constitutes a material having a high strength and a low thermal conductivity. Therefore, the low thermal conductivity ceramic can be used as parts having a low thermal conductivity and a high strength in, for example, insulated engines, that is, thermally insulated engines.

Further, in the process for producing the low thermal conductivity ceramic, because the pressure of the gas atmosphere is regulated to 5 atm or more, the structure is hyperfined to enhance phonon scattering, so that the lowering in the thermal conductivity is attained.

In general, in ceramics, in order to enhance the strength, it is desired to render the structure denser. An increase in the denseness of the structure, however, leads to an unfavorable increase in the thermal conductivity. On the other hand, in the present invention, the increase in the denseness of the structure and the lowering in the thermal conductivity are attained by increasing the phonon scattering serving as a carrier of heat in the covalently bonded ceramics and introducing turbulence, that is, anharmonicity.

From the viewpoint of the structure, the present invention resides in the formation of a solid solution, the fining of grains and the introduction of heavy elements. In the present invention, these requirements are met by adding oxides of heavy elements to a sialon in solid solution form, applying a gas pressure for the purpose of enhancing the frequency of nucleation of grains during sintering, and conducting the temperature rise at a high rate and the sintering at a low temperature for the purpose of inhibiting crystal grain growth.

Further, in the process for producing the low thermal conductivity ceramic, conducting the sintering in a gas atmosphere having a pressure of 5 atm or more, that is, while regulating the atmosphere having a high gas pressure, enables the ceramic structure to be hyperfined, the phonon scattering to be enhanced and a lowering in the thermal conductivity to be attained.

DETAILED DESCRIPTION OF THE EMBODIMENT

Embodiments of the low thermal conductivity ceramic and process for producing the same according to the present invention will now be described. The low thermal conductivity ceramic according to the present invention comprises as a main component a sialon Si—Al—O—N containing silicon (Si), aluminum (Al), oxygen (O) and nitrogen (N), and, added thereto, at least one element selected from the group consisting of lanthanum (La), dysprosium (Dy), cerium (Ce), hafnium (Hf) and zirconium (Zr). Further, the ceramic containing these elements has an average grain size of 1.5 μm or less and a thermal conductivity of 0.01 cal/cm·s·°C. or less. More specifically, in this low thermal conductivity ceramic, it is thought that the number of grain boundaries of the lattice increases with decreasing the grain size of the sialon, and heavy elements such as lanthanum (La) are dissolved in solid solution form at the grain boundary of the lattice or in the lattice, so that no heat is transferred at the interface.

The low thermal conductivity ceramic according to the present invention can be produced according to the following process. An embodiment of the process for producing the low thermal conductivity ceramic according to the present invention will now be described.

In the production of the low thermal conductivity ceramic, a mixture of an α sialon with 5% of $Al_2O_3$ and $La_2O_3$ was milled in a ball mill for about 24 hours by using methanol as a medium and polyvinyl butyral (PVB) as a binder. All the feedstock powders used had an average particle diameter of 0.5 μm or less. Then, the powders were granulated on a spray drier and molded by CIP (cold isostatic press) into a pellets having a thickness of 2 mm and a diameter of 12 mm and a bar having a length of 60 mm, a width of 6 mm and a thickness of 5 mm.

The temperature of these moldings were raised up to 500° C. in a nitrogen ($N_2$) gas atmosphere having a pressure of 3 atm to conduct heat degreasing before the moldings were fired. In the firing, the temperature was raised to 1760° C. over a period of about 3 hours and maintained at that temperature for one hour. During this step, a nitrogen gas having a pressure of 100 atm was applied. After cooling the sintering furnace, the resultant sinters were taken out of the furnace. The sinter of the pellet was worked so as to have a size of 1 mm in thickness and 10 mm in diameter, while that of the bar was worked so as to have a size of 40 mm in length, 4 mm in width and 3 mm in thickness. In this case, four test samples were prepared for the sinter of the pellet, while 40 test samples were prepared for the sinter of the bar. These test samples were applied to the measurement of thermal conductivity (cal/cm·s·°C.) by the laser flash method and the four-point strength test.

Figure 1:
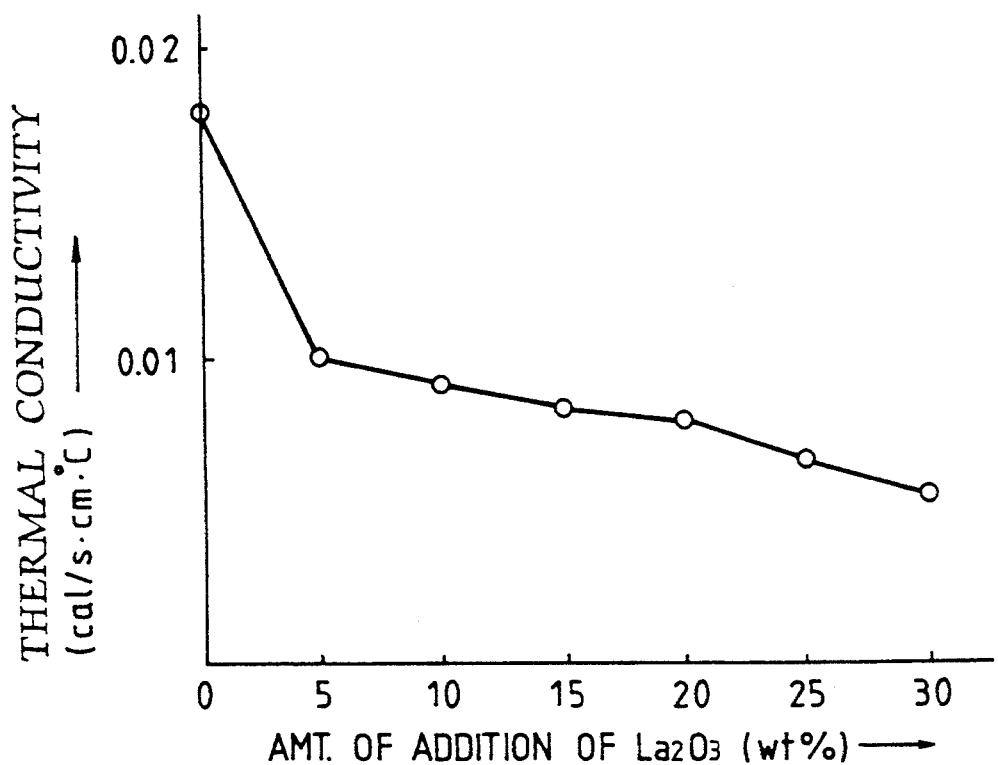
FIG. 1 is a graph showing the relationship between the amount of addition of $La_2O_3$ to a sialon and the thermal conductivity according to one embodiment of the low thermal expansion ceramic material of the present invention.

FIG. 1 is a graph showing the relationship between the amount of addition of $La_2O_3$ to a sialon and the thermal conductivity. In FIG. 1, the abscissa represents the amount (% by weight) of addition of $La_2O_3$ to a sialon, that is, $La_2O_3/(La_2O_3 + sialon + Al_2O_3) \times 100$ (% by weight), and the ordinate represents the thermal conductivity (cal/s·cm·°C.). As is apparent from the drawing, when no $La_2O_3$ is added to the sialon, the thermal conductivity is about 0.02 cal/cm·s·°C., while the addition of $La_2O_3$ in an amount of 5% causes the thermal conductivity to be lowered to 0.01 cal/cm·s·°C., and the thermal conductivity further lowers with increasing the amount of addition of $La_2O_3$ to more than 5% or more. For example, when the use of the ceramic as engine parts is intended, it is apparent that a thermal conductivity of about 0.01 cal/cm·s·°C. or less as a standard property for this purpose can be attained by adding $La_2O_3$ in an amount of 5% or more to the sialon.

Figure 2:
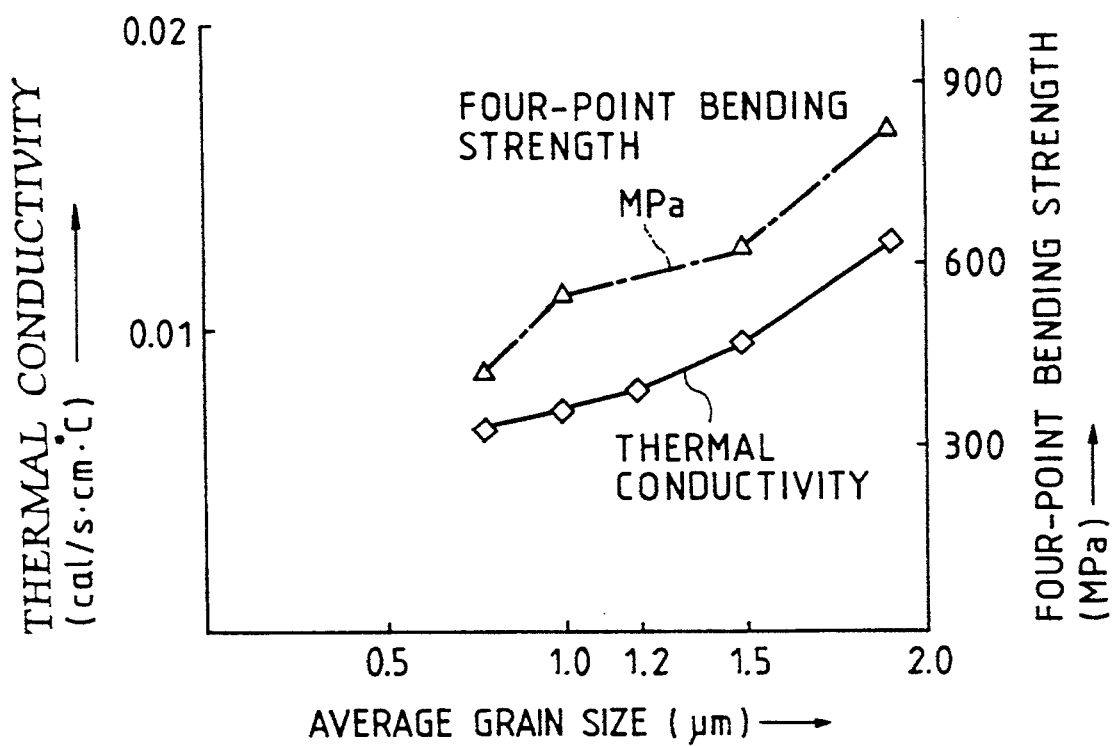
FIG. 2 is a graph showing the relationship between the average grain size and the thermal conductivity and four-point bending strength.

Further, among the test samples, a test sample having a $La_2O_3$ content of 20% was subjected to measurement of the average grain size through the observation of the structure by SEM (scanning electron microscopy) and image processing. As a result, the average grain size was found to be about 1.2 μm. FIG. 2 is a graph showing the relationship between the average grain size and the thermal conductivity of a sample produced by regulating the average grain size through a variation in the firing conditions. In FIG. 2, the abscissa represents the average grain size (μm), and the ordinate represents the thermal conductivity (cal/cm·s·°C.) and the four-point bending strength (MPa). In FIG. 2, it was found that a low thermal conductivity could be attained when the average grain size of an oxide containing a sialon and additive elements was 1.5 μm or less. Further, as shown in FIG. 2, regarding the strength of the low thermal conductivity ceramic as well, the ceramic has a strength of 400 MPa or more which can be regarded as a high strength when the balance between the strength and the thermal conductivity is taken into consideration.

Further, the low thermal conductivity ceramic samples produced by adding 5% or more of $La_2O_3$ to the sialon were subjected to measurement of X-ray diffraction pattern. As a result, it was found that a compound of $La_2Si_6N_8O_3$ was formed.

Another embodiment of the process for producing the low thermal conductivity ceramic will now be described. In this embodiment, low thermal conductivity ceramics were prepared in the same manner as that used in the above-described embodiment, except that $ZrO_2$, $Dy_2O_3$, $CeO_2$ and $HfO_2$ (hafnium oxide) were used as the additive to the sialon instead of $La_2O_3$ with the amount of addition of the additives being 20%. The resultant low thermal conductivity ceramics were tested in the same manner as that used in the above-described embodiment. As a result, it was found that all the ceramics had a low thermal conductivity similar to that attained in the above-described embodiment.

In order to compare the low thermal conductivity ceramics according to the present invention with other ceramics, ceramics were prepared in the same manner as that used in the above-described embodiments, except that among the components constituting the feedstock powder, the sialon was replaced with silicon nitride (α-$Si_3N_4$). The resultant ceramics were tested in the same manner as that used in the above-described embodiments to find out that the thermal conductivity was about twice those of the ceramics where the sialon was used. This result supposedly derives from such a phenomenon that the amount of the solid solution is so small that the introduction of anharmonicity is unsatisfactory, whereby the thermal conductivity cannot be lowered.

Further, in order to compare the low thermal conductivity ceramics according to the present invention with other ceramics, ceramics were prepared by adding $La_2O_3$ in an amount of 20% to the sialon and varying the pressure of the gas atmosphere during firing. The ceramic fired under a gas atmosphere pressure of 1 atm, that is, under atmospheric pressure, had a thermal conductivity of 0.016 cal/cm·s·°C. On the other hand, the ceramic fired under a gas atmosphere pressure of 5 atm had a thermal conductivity of 0.01 cal/cm·s·°C. From the viewpoint of the structure, it was found that the grain density per unit area was low when the firing was conducted under a pressure of 1 atm. This result is thought to derive from such a phenomenon that the nitrogen gas concentration during firing was so low that the frequency of nucleation was lowered.

What is claimed is:

1. A low thermal conductivity ceramic body comprising
   a composite of all of elements Si, Al, O, N, and La, said ceramic composite including a phase of Si—Al—O—N and $La_2Si_6N_8O_6$ present in an amount, converted into that of $La_2O_3$, in the range of 10 to about 30 wt %,
   said composite being sintered and having an average crystal grain size in the range of 0.5 to 1.5 μm, and a thermal conductivity not higher than 0.01 cal/s·cm·°C.

2. A low thermal conductivity sintered ceramic body according to claim 1 having a bending strength of at least 400 MPa.

3. A low thermal conductivity sintered ceramic body according to claim 1, having a high density and a hyperfine structure.

* * * * *